US009115652B2

(12) United States Patent
Choi et al.

(10) Patent No.: US 9,115,652 B2
(45) Date of Patent: Aug. 25, 2015

(54) OIL CONTROL VALVE AND VARIABLE VALVE LIFT SYSTEM PROVIDED WITH THE SAME

(75) Inventors: Byong Young Choi, Bucheon-si (KR); Young Hong Kwak, Suwon (KR); Gee Wook Shin, Hwaseong (KR); Jin Kook Kong, Suwon-si (KR); Soo Hyung Woo, Yongin-si (KR); Chang-Hoon Lee, Busan (KR)

(73) Assignees: HYUNDAI MOTOR COMPANY, Seoul (KR); UNICK CORPORATION, Busan (KR)

( * ) Notice: Subject to any disclaimer, the term of this patent is extended or adjusted under 35 U.S.C. 154(b) by 870 days.

(21) Appl. No.: 13/312,745

(22) Filed: Dec. 6, 2011

(65) Prior Publication Data
US 2012/0291889 A1  Nov. 22, 2012

(30) Foreign Application Priority Data

May 16, 2011 (KR) .................. 10-2011-0045856

(51) Int. Cl.
| | |
|---|---|
| F16K 15/00 | (2006.01) |
| F02D 13/02 | (2006.01) |
| F01L 13/00 | (2006.01) |
| F16K 15/18 | (2006.01) |
| F16K 31/06 | (2006.01) |
| F15B 13/04 | (2006.01) |
| F01L 1/24 | (2006.01) |
| F01L 1/344 | (2006.01) |

(52) U.S. Cl.
CPC ......... *F02D 13/0253* (2013.01); *F01L 13/0015* (2013.01); *F15B 13/0405* (2013.01); *F16K 15/183* (2013.01); *F16K 31/0637* (2013.01); *F01L 2001/2444* (2013.01); *F01L 2001/3443* (2013.01); *Y02T 10/18* (2013.01); *Y10T 137/7838* (2015.04)

(58) Field of Classification Search
CPC .............. F02D 13/0253; F16K 15/183; F16K 31/0637; F01L 13/0015; F01L 2001/3443; Y10T 137/7838
USPC ......... 137/512, 512.3, 315.06, 601.13, 487.5; 251/129.15
See application file for complete search history.

(56) References Cited

U.S. PATENT DOCUMENTS

| 2,217,141 | A | * | 10/1940 | Sprenkle ................... 192/13 A |
| 3,225,782 | A | * | 12/1965 | Begley et al. ............ 137/115.02 |
| 6,412,457 | B1 | | 7/2002 | Vorih et al. |

FOREIGN PATENT DOCUMENTS

| JP | 8-93425 A | 4/1996 |
| JP | 4587889 B2 | 9/2010 |

*Primary Examiner* — Kevin Lee
*Assistant Examiner* — P. Macade Nichols
(74) *Attorney, Agent, or Firm* — Morgan, Lewis & Bockius LLP

(57) ABSTRACT

An oil control valve includes a housing having a control port and a drain port, a first seat with a first penetration hole forming a first chamber, a second seat with a second penetration hole forming a second chamber communicated with the control port, the second seat with the housing forming a third chamber communicating with the drain port, a first check valve within the first chamber selectively closing the first penetration hole, a second check valve within the third chamber selectively closing the second penetration hole, and a third penetration hole, a control portion selectively opening the first check valve and simultaneously closing the second check valve or selectively closing the first check valve and simultaneously opening the second check valve and an orifice connecting the first chamber with the second chamber.

4 Claims, 5 Drawing Sheets

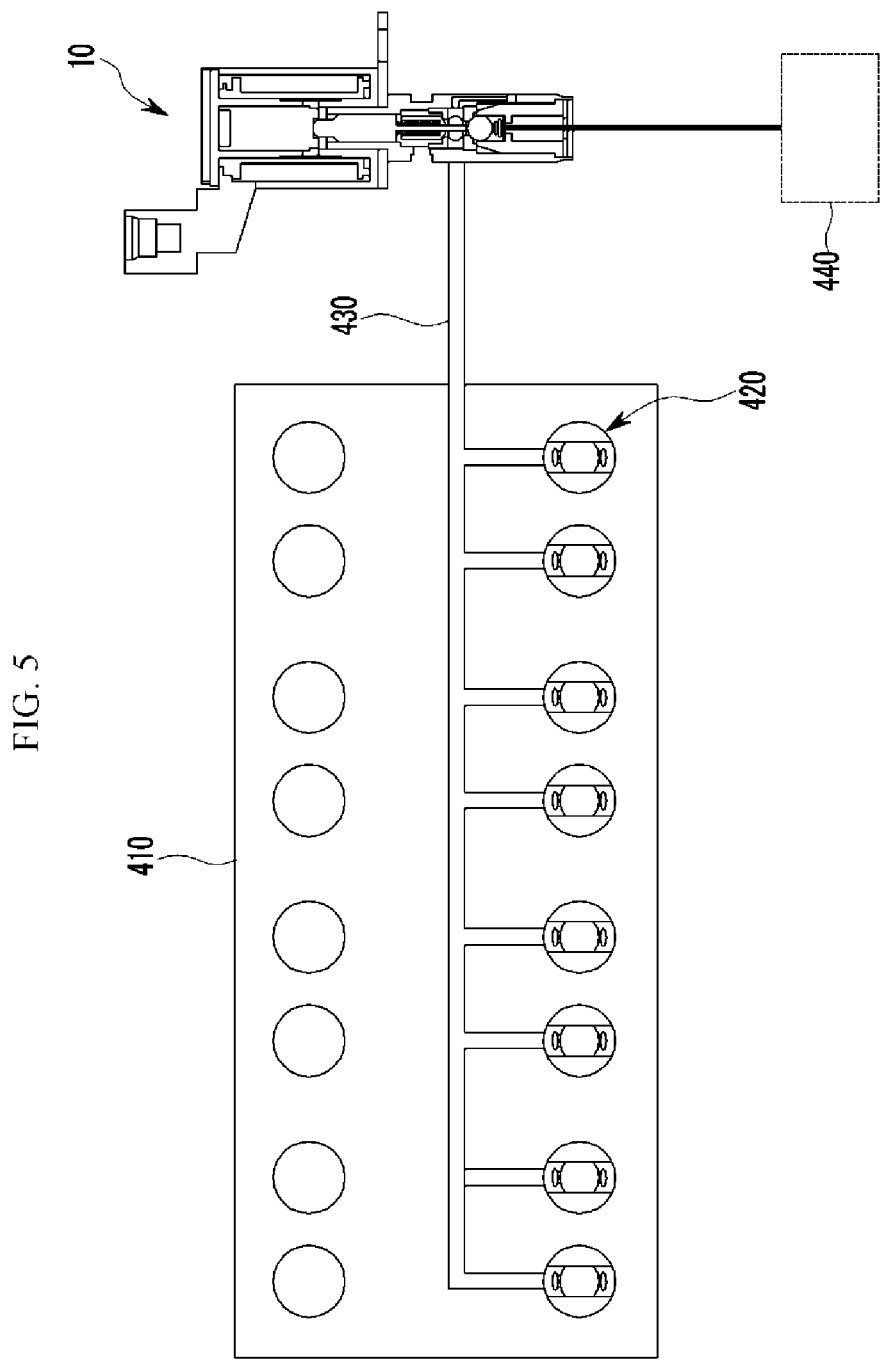

OIL CONTROL VALVE AND VARIABLE VALVE LIFT SYSTEM PROVIDED WITH THE SAME

CROSS-REFERENCE TO RELATED APPLICATION

The present application claims the priority of Korean Patent Application Number 10-2011-0045856 filed May 16, 2011, the entire contents of which application is incorporated herein for all purposes by this reference.

BACKGROUND OF INVENTION

1. Field of Invention

The present invention relates to an oil control valve and a variable valve lift system provided with the same. More particularly, the present invention relates to an oil control valve of which an orifice is integrally formed therein and a variable valve lift system provided with the same.

2. Description of Related Art

Generally, for constructing a hydraulic pressure type variable valve lift apparatus, there are required constituent elements such as a variable valve lift apparatus for controlling valve lift, an oil control valve supplying hydraulic pressure to hydraulic lines, an orifice reducing hydraulic pressure supplied from an hydraulic pump and so on.

A general orifice has a structure for absorbing transmitted wave transmitted from low pressure hydraulic line and lowers hydraulic pressure supplied from an engine oil pump to reach certain level for a variable valve lift apparatus to realize low valve.

However, a general variable valve lift system requires the orifice, an oil control valve, a variable valve lift apparatus, a plurality of oil line connecting those elements, and thus engine layout is complicated.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for an oil control valve and a variable valve lift system provided with the same having advantages of having simplified oil lines and engine layout with an integrally formed orifice.

An oil control valve according to various aspects of the present invention may include a housing of which a control port and a drain port are formed thereto, a first seat of which a first penetration hole is formed thereto, disposed within the housing and the first seat with the housing forming a first chamber, a second seat of which a second penetration hole is formed thereto, disposed within the housing and the second seat with the housing forming a second chamber communicated with the control port and the second seat with the housing forming a third chamber communicate with the drain port, a first check valve disposed within the first chamber for selectively closing the first penetration hole, a second check valve disposed within the third chamber for selectively closing the second penetration hole and a third penetration hole is formed thereto, a control portion which selectively opens the first check valve and simultaneously closes the second check valve or selectively closes the first check valve and simultaneously opens the second check valve and an orifice connecting the first chamber with the second chamber.

The orifice may be formed as "S" shape.

The oil control valve may further include a flange which forms the first chamber and includes a first elastic portion elastically supporting the first check valve.

The oil control valve may further include a second elastic portion disposed within the third chamber and elastically supporting the second check valve for the second check valve to selectively close the second penetration hole.

The control portion may include a pilot of which a stepped portion selectively pushing the second check valve to close the second penetration hole is formed thereto and of which a control rod selectively pushing the first check valve to be opened through the third penetration hole and the second penetration hole is formed thereto.

The control portion may include a case connected to the housing, a plunger movably disposed within the case and selectively moving the pilot, a bobbin wrapping the plunger and wrapped by a coil and a yoke disposed between the bobbin and the plunger.

A variable valve lift system according to various aspects of the present invention may include a housing of which a control port and a drain port are formed thereto, a first seat of which a first penetration hole is formed thereto, disposed within the housing and the first seat with the housing forming a first chamber, a second seat of which a second penetration hole is formed thereto, disposed within the housing and the second seat with the housing forming a second chamber communicated with the control port and the second seat with the housing forming a third chamber communicate with the drain port, a first check valve disposed within the first chamber for selectively closing the first penetration hole, a second check valve disposed within the third chamber for selectively closing the second penetration hole and a third penetration hole is formed thereto, a control portion which selectively opens the first check valve and simultaneously closes the second check valve or selectively closes the first check valve and simultaneously opens the second check valve, an orifice connecting the first chamber with the second chamber and a variable valve lift apparatus communicate with the control port by an oil line.

The orifice may be formed as "S" shape.

The oil control valve may further include a flange which forms the first chamber and includes a first elastic portion elastically supporting the first check valve.

The oil control valve may further include a second elastic portion disposed within the third chamber and elastically supporting the second check valve for the second check valve to selectively close the second penetration hole.

The control portion may include a pilot of which a stepped portion selectively pushing the second check valve to close the second penetration hole is formed thereto and of which a control rod selectively pushing the first check valve to be opened through the third penetration hole and the second penetration hole is formed thereto.

The control portion may include a case connected to the housing, a plunger movably disposed within the case and selectively moving the pilot, a bobbin wrapping the plunger and wrapped by a coil and a yoke disposed between the bobbin and the plunger.

An oil control valve and a variable valve lift system provided with the same according to various aspects of the present invention may have simplified oil lines and engine layout with an integrally formed orifice.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5 is a drawing of an exemplary variable valve system according to the present invention showing operations of the variable valve system in high pressure oil supplying.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
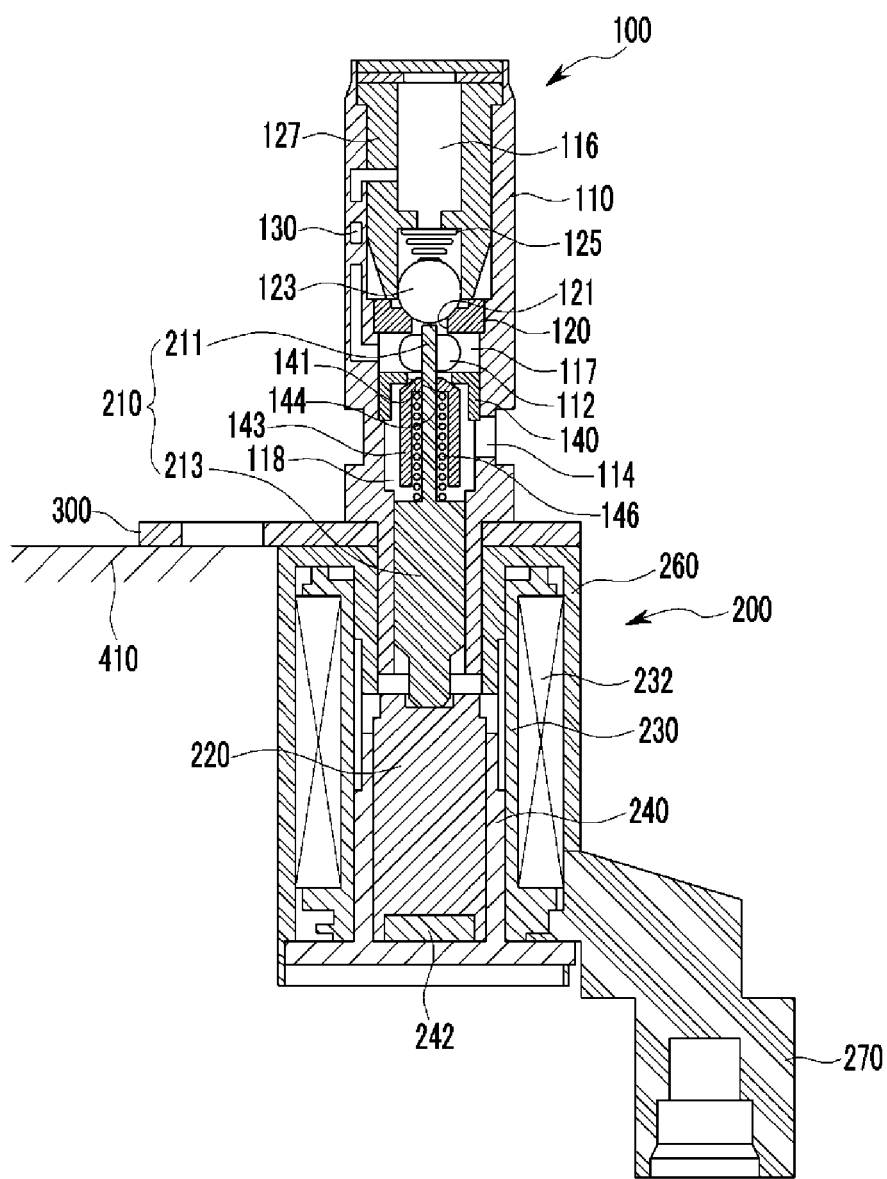
FIG. 1 is a cross-sectional view of an exemplary oil control valve according to the present invention showing operations of the oil control valve in low pressure oil supplying.
Figure 2:
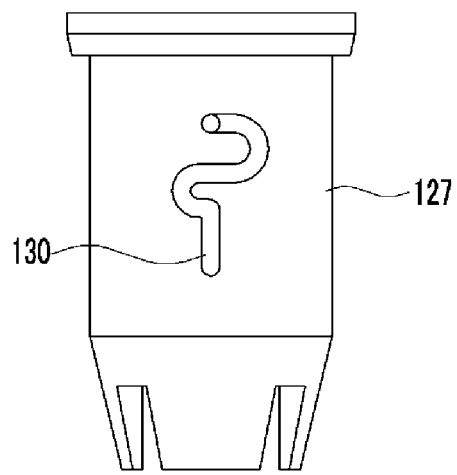
FIG. 2 is as drawing showing an orifice of an exemplary oil control valve according to the present invention.
Figure 3:
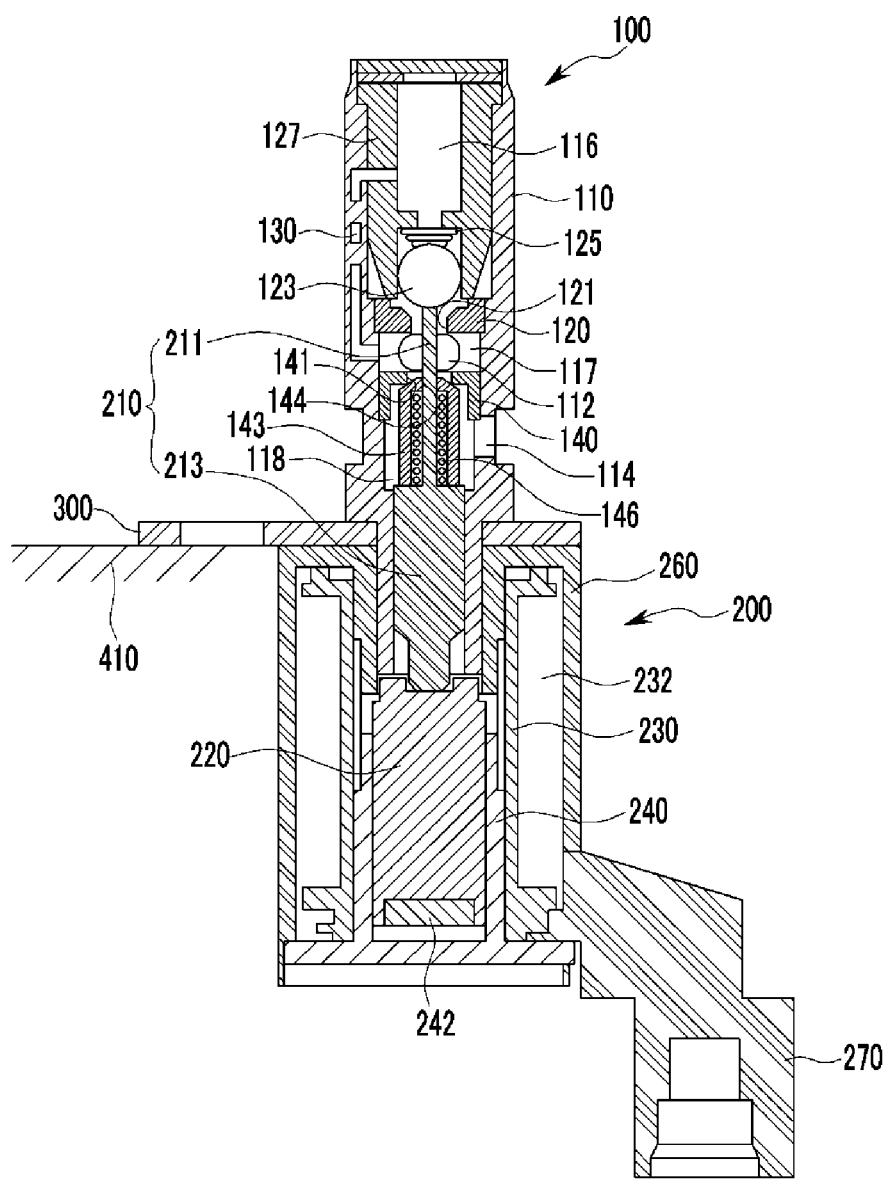
FIG. 3 is a cross-sectional view of an exemplary oil control valve according to the present invention showing operations of the oil control valve in high pressure oil supplying.

FIG. 1 is a cross-sectional view of an oil control valve according to various embodiments of the present invention showing operations of the oil control valve in low pressure oil supplying, FIG. 2 is as drawing showing an orifice of an oil control valve according to various embodiments of the present invention, and FIG. 3 is a cross-sectional view of an oil control valve according to various embodiments of the present invention showing operations of the oil control valve in high pressure oil supplying.

Referring to FIG. 1 to FIG. 3, an oil control valve 10 according to various embodiments of the present invention includes a hydraulic pressure portion 100 and a control portion 200.

The hydraulic pressure portion 100 includes a housing 110 of which a control port 112 and a drain port 114 are formed thereto, a first seat 120 of which a first penetration hole 121 is formed thereto, disposed within the housing 110 and the first seat 120 with the housing 110 forming a first chamber 116, a second seat 140 of which a second penetration hole 141 is formed thereto, disposed within the housing 110 and the second seat 140 with the housing 110 forming a second chamber 117 communicated with the control port 112 and the second seat 140 with the housing 110 forming a third chamber 118 communicate with the drain port 114, a first check valve 123 disposed within the first chamber 116 for selectively closing the first penetration hole 121, and a second check valve 143 disposed within the third chamber 118 for selectively closing the second penetration hole 141 and a third penetration hole 144 is formed thereto.

The control portion 200 selectively opens the first check valve 123 and simultaneously closes the second check valve 143 or selectively closes the first check valve 123 and simultaneously opens the second check valve 143.

The oil control valve 10 according to various embodiments of the present invention includes an orifice 130 connecting the first chamber 116 with the second chamber 117 and the orifice 130 is formed as "S" shape as shown in FIG. 2.

A general oil control valve and an orifice are mounted separately each other, and thus it is difficult to design a plurality of hydraulic lines in an engine cylinder head. If oil pressure changes supplying to a variable valve lift apparatus are delayed due to complicated hydraulic lines, switching performance of the variable valve lift apparatus is deteriorated and also quality of a vehicle is deteriorated.

However, the oil control valve 10 according to various embodiments of the present invention is provided with the orifice 130 integrally and thus layout of the hydraulic lines may be simplified. Thus, oil pressure changes supplying to a variable valve lift apparatus are rapidly transmitted to the variable lift apparatus, and switching performance of the variable valve lift apparatus is enhanced. Also, processing hydraulic lines to an engine cylinder head and required installation space may be reduced so that manufacturing cost and process may be reduced.

The orifice 130 is shaped as "S" for absorbing pulsation transmitted from low pressure hydraulic oil line.

The oil control valve 10 further includes a flange 127 which forms the first chamber 116 and includes a first elastic portion 125 elastically supporting the first check valve 123.

The orifice 130 may be formed to the flange 127 or the housing 110, or the flange 127 and the housing 110 may form the orifice 130 together.

Since the flange 127 is inserted into the housing 110 and thus the orifice 130 may be formed easily.

The oil control valve 10 further includes a second elastic portion 146 disposed within the third chamber 118 and elastically supporting the second check valve 143 for the second check valve 143 to selectively close the second penetration hole 141.

The control portion 200 includes a pilot 210 of which a stepped portion 213 selectively pushing the second check valve 143 to close the second penetration hole 14 is formed thereto and of which a control rod 211 selectively pushing the first check valve 123 to be opened through the third penetration hole 144 and the second penetration hole 141 is formed thereto.

The control portion 200 includes a case 260 connected to the housing 110, a plunger 220 movably disposed within the case 230 and selectively moving the pilot 210, a bobbin 230 wrapping the plunger 220 and wrapped by a coil 232 and a yoke 240 disposed between the bobbin 230 and the plunger 220.

The oil control valve 10 is connected to an engine 410 via a bracket 300 and the control portion 200 is connected to a connector 270 for being supplied power to operate the control portion 200.

Figure 4:
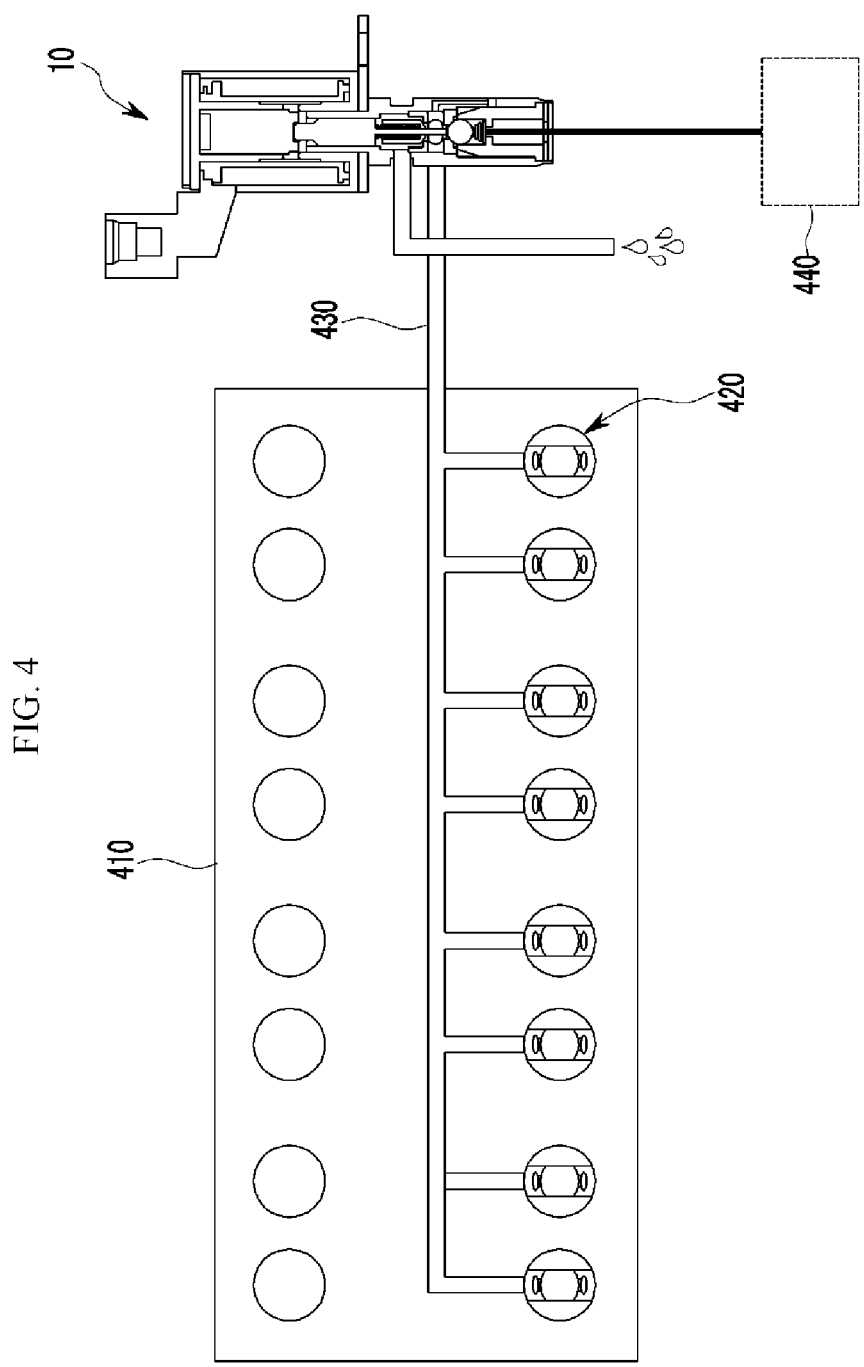
FIG. 4 is a drawing of an exemplary variable valve system according to the present invention showing operations of the variable valve system in low pressure oil supplying.

FIG. 4 is a drawing of a variable valve system according to various embodiments of the present invention showing operations of the variable valve system in low pressure oil supplying, and FIG. 5 is a drawing of a variable valve system according to various embodiments of the present invention showing operations of the variable valve system in high pressure oil supplying.

Referring to FIG. 4 and FIG. 5, a variable valve system according to various embodiments of the present invention includes the oil control valve 10, a variable valve lift apparatus 420 and an oil line 430 connecting the variable valve lift apparatus 420 with the control port 112 to be communicated with.

While a general variable valve system requires a high pressure hydraulic line connecting each variable valve lift apparatus with an oil control valve for supplying high pressure oil to each variable valve lift apparatus and a low pressure hydraulic line connecting each variable valve lift apparatus with an orifice for supplying low pressure oil to each variable valve lift apparatus, however, the variable valve system according to various embodiments of the present invention may simplify oil lines because the orifice 130 is formed within the oil control valve 10 and the control port 112 may supply high pressure oil or low pressure oil selectively.

Hereinafter, referring to FIG. 1 and FIG. 4, operation of the oil control valve and the variable valve system provided with the same according to various embodiments of the present invention in low pressure oil supplying will be described.

If the variable valve lift apparatus 420 is operated in the low lift mode, the plunger 220 is not magnetized, and the first check valve 132 closes the first penetration hole 121.

And thus, high pressure oil in the first chamber 116 is not directly supplied to the second chamber 117, but high pressure oil in the first chamber 116 passes through the orifice 130 and pressure of the oil drops and then the low pressure oil is supplied to the second chamber 117.

And then, the oil supplied to the second chamber 117 is supplied to each variable valve lift apparatus 420 via the control port 112 and the oil line 430.

If force exerted by pressure within the second chamber 117 is higher than elastic force of the second elastic portion 146, the second check valve 143 is opened and then the oil is exhausted through the drain port 114.

And thus, the pressure within the second chamber 117 may be maintained in some level.

Hereinafter, referring to FIG. 2 and FIG. 5, operation of the oil control valve and the variable valve system provided with the same according to various embodiments of the present invention in high pressure oil supplying will be described.

If the variable valve lift apparatus 420 is operated in the high lift mode, the plunger 220 is magnetized by electric power supplying from the connector 270, the plunger 220 moves with the pilot 210, the control rod 211 opens the first check valve 123, and the stepped portion 213 pushes the second check valve 143 so that the second check valve 143 closes the second penetration hole 141.

And thus, the high pressure oil in the first chamber 116 is supplied to each variable valve lift apparatus 420 via the second chamber 117, the control port 112 and the oil line 430.

As described above, the oil control valve and the variable valve lift apparatus provided with the same according to various embodiments of the present invention may simplify oil supply lines for supplying oil for operating the variable valve lift apparatus with simple scheme, and thus manufacturing process may be simplified and layout of the engine also may be simplified.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A variable valve lift system comprising:
a housing including a control port and a drain port;
a first seat disposed within the housing including a first penetration hole and forming a first chamber with the housing;
a second seat disposed within the housing including a second penetration hole and forming a second chamber with the housing that fluidly communicates with the control port, the second seat also forming a third chamber with the housing communicating with the drain port;
a first check valve disposed within the first chamber for selectively closing the first penetration hole;
a second check valve disposed within the third chamber for selectively closing the second penetration hole, the second check valve including a third penetration hole;
a control portion which selectively opens the first check valve and simultaneously closes the second check valve or selectively closes the first check valve and simultaneously opens the second check valve;
an orifice connecting the first chamber with the second chamber; and
a variable valve lift apparatus communicate with the control port by an oil line,
wherein the control portion comprises:
a pilot of which a stepped portion being selectively engaged to the second check valve to push the second check valve to close the second penetration hole is formed thereto and of which a control rod selectively pushing the first check valve to be opened through the third penetration hole and the second penetration hole is formed thereto;
a case connected to the housing;
a plunger movably disposed within the case and selectively moving the pilot;
a bobbin wrapping the plunger and wrapped by a coil; and
a yoke disposed between the bobbin and the plunger.

2. A variable valve lift system of claim 1, wherein the orifice is "S" shaped.

3. A variable valve lift system of claim 1, further comprises a flange which forms the first chamber and includes a first elastic portion elastically supporting the first check valve.

4. A variable valve lift system of claim 1, further comprises a second elastic portion disposed within the third chamber and elastically supporting the second check valve for the second check valve to selectively close the second penetration hole.

* * * * *